March 18, 1952 E. SOKOLIK 2,589,581
VERTICAL-HORIZONTAL BALL CHECK VALVE
Filed May 6, 1946
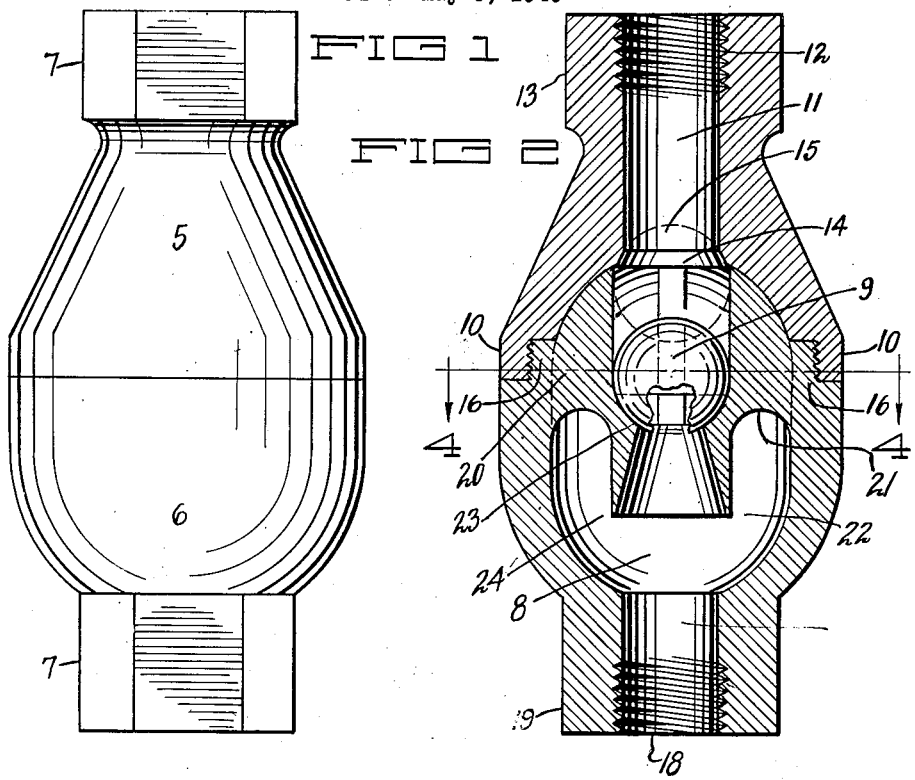
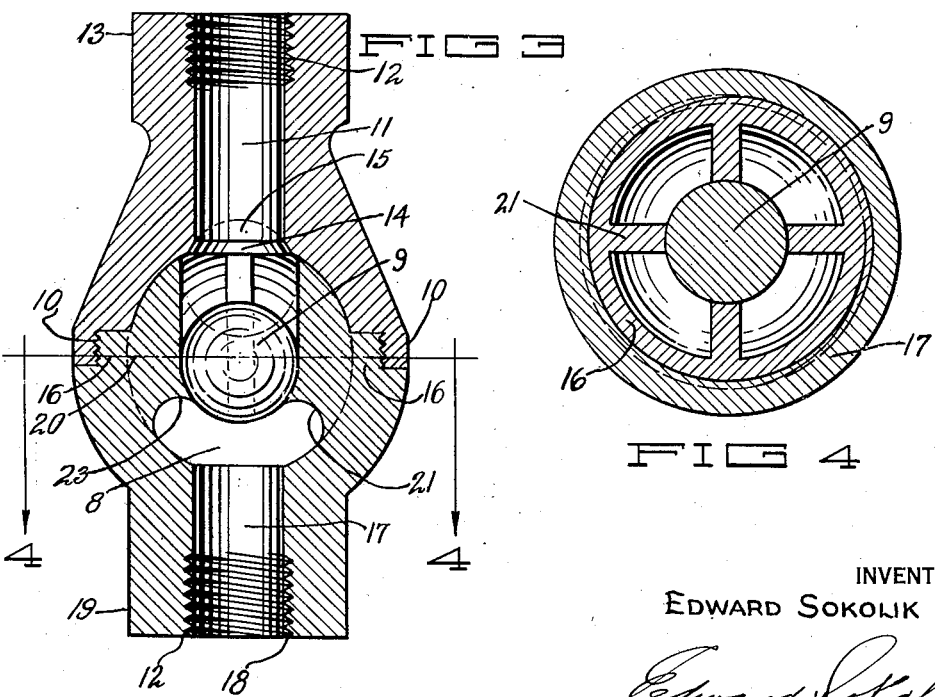
INVENTOR
EDWARD SOKOLIK Patented Mar. 18, 1952

2,589,581

UNITED STATES PATENT OFFICE 2,589,581

VERTICAL-HORIZONTAL BALL CHECK VALVE

Edward Sokolik, New Brighton, Minn.

Application May 6, 1946, Serial No. 667,513

7 Claims. (Cl. 251—121)

My present invention relates to improvements in check valves and the objects are to provide a ball check valve having a checking efficiency in horizontal, oblique or vertical position.

A further object is to provide a ball check valve having quick, positive and stable checking efficiency, regardless of its position.

A further object of my invention is to provide a ball check valve, wherein the check ball is guided during normal flow by radial fins to a stop member, and wherein a Venturi nozzle means is provided preferably integral with such fins so as to accelerate the back flow of the liquid to directly strike the check ball urging it to the seat at the orifice of the inlet duct or in lieu of the Venturi nozzle a structure substantially equivalent to the Venturi nozzle, but simpler and cheaper to construct.

To the above end, the invention comprises the novel features and combination thereof, hereinafter described and defined in the claims.

In the accompanying drawings, which illustrate the invention, like characters designate like parts throughout the several views.

Figure 1 is an elevational view of my improved check valve.

Figure 2 is a longitudinal cross-section of Figure 1.

Figure 3 is a modification of the valve omitting the liquid accelerating Venturi nozzle and embodying a structure substantially equivalent in function.

Figure 4 is a cross-section of the valve on line 4—4 of Figure 3.

The two interlocking and complementary sections 5 and 6 have each the wrench faces 7 and together a peripheric chamber 8 for a fin-guideway 20 with the ball 9 therein. This chamber is of ellipsoidal contours in the structure illustrated in Figures 1 and 2, and substantially of globular contours as illustrated in Figure 3.

The section 5, as illustrated, has the internal screw-threads 10, and the liquid intake duct 11 which, as illustrated, has screw-threads 12 formed in the outer end-portion 13 thereof. This duct 11 is smaller in diameter than the check ball 9 and has a seat 14 preferably counter-sunk in the inner orifice 15 thereof, for the check ball 9.

The section 6, as illustrated, has the external screw-threads 16 adapted to mesh with the screw-threads 10, and the discharge duct 17 which, as illustrated, has internal screw-threads 18 formed in the outer end-portion 19 thereof.

Axially disposed in the chamber 8, is a fin-guideway 20 including a plurality of fins 21 radially spaced apart to provide a runway for the ball 9 and extending from the inner periphery surrounding the orifice of the duct 11, into the chamber 8 and connecting with the Venturi section 22 which, as illustrated, also affords a stop-seat 23 for the ball 9.

The fins 21, as shown, are integral with one of the sections 5 or 6 and with the Venturi nozzle 22 and contouring to a portion of the periphery of the chamber 8.

The Venturi nozzle 22 is shown as having a diameter corresponding to the diameter of the check ball 9 and an annular seat 23 for and contoured to the ball 9, which is buoyant in the liquid which it checks, if the valve is uprightly disposed with the supply duct 11 thereof on top. The check ball 9 may be hollow, of light alloy, of plastic or other light material when used in a valve with the supply duct uppermost.

In a horizontally positioned check valve, the inflow, through the duct 11, moves the check ball 9 from the seat 14 in the slide bore of the guideway 20 onto the stop-seat 23 and passes from the slide bore or runway between the fins 21, by-passing the ball 9 and Venturi nozzle 22 and out through the annular passageway 24 of the chamber 8 and into the outlet duct 17. Liquid back flow mostly by-passes the passageway 24 directly into the Venturi nozzle 22 and is accelerated therein and directed against the check ball 9 through the large orifice in the annular stop-seat 23, moving the ball 9 rectilinearly and concentrically aligned between the fin-guides 21 to the counter-sunk seat 14, closing the duct 11 and checking the back flow.

In an uprightly disposed valve with the supply duct uppermost, the buoyant ball checks automatically and when the pressure of the back flow exceeds the pressure of the inflow, the inflow no longer keeps the ball away from the seat 14 and back flow is checked.

The stop-seat 23 of the Venturi nozzle 22, is illustrated in Fig. 2 as affording a stop-seat in conjunction with the arched lower portion of the fin-guides 21. By a slight change in the seating structure either the Venturi nozzle or the arched lower portions of the fin guides could serve independently as stop-seat as shown in Fig. 3.

In the modification shown in Fig. 3, the Venturi section 22 is deleted and the arched lower ledges of the fin-guides 21 together serve as stop-seat means 23 for the ball valve 9. These arched faces of the lower ledges of the fin-guides 21 are adapted to expose a large portion of the ball valve 9 to the back flow and not to impede the back flow so as to cause quick unseating of the ball valve by the back flow which rapidly moves the valve in the slideway into a checking position onto the seat.

This stop-seat means 23 is spatially enveloped by the omni-rounded periphery of the sections 5 and 6 to permit a free unimpeded by-pass of the flow through the chamber 8.

It is to be understood that the form of my invention herein shown and described, is to be taken as a preferred example of the same, and that various changes in the shape, size and arrangement of parts may be resorted to without departing from the spirit of my invention or scope of the appended claims.

What I claim is:

1. A check valve comprising an intake section and a discharge section joined together by screw-threaded means and together having an omni-rounded inner periphery forming an omni-rounded chamber, adapted to facilitate flow, the intake section having an inlet duct leading to the chamber and a seat adapted to seat a check ball valve, encompassing the inner orifice of the inlet duct and affording a juncture of the duct and the periphery of the said section, and the discharge section having an outlet duct leading from the chamber, said chamber including in consecutive communication a bored guideway portion extending axially inwardly in the chamber from the inlet duct toward the outlet duct and including a plurality of radially spaced apart, elongated fin-guides axially disposed in the chamber, bored in the central axis to afford a slideway for a check ball valve, and coinciding and communicating with the omni-rounded inner periphery of the sections, seat means affording a stop for the valve, said seat means having seating contours coinciding with the contour of the ball valve; and means for causing quick unseating of the valve by the back flow which rapidly moves said valve in the slideway into checking position onto the seat, said means facing the outlet duct and being spatially enveloped by the omni-rounded periphery of the sections.

2. A check valve comprising an intake section and a discharge section joined together by screw-threaded means and together having an omni-rounded inner periphery forming an omni-rounded chamber, the intake section having an inlet duct leading to the chamber and a seat adapted to seat a check ball valve, encompassing the inner orifice of the inlet duct and affording a juncture of the duct and the periphery of the said section, and the discharge section having an outlet duct leading from the chamber, said chamber including in consecutive communication a bored guideway portion extending axially inwardly in the chamber from the inlet duct toward the outlet duct and including a plurality of radially spaced apart, elongated fin-guides axially disposed in the chamber and integral with the omni-rounded inner periphery of one of the sections, bored in the central axis to afford a slideway for a check ball valve, and coinciding and communicating with the omni-rounded inner periphery of the sections; stop-seat means for the ball valve, said seat means having seating contours coinciding with the contour of the ball valve; and means for causing quick unseating of the valve by the back flow which rapidly moves said valve in the slideway into checking position onto the seat, said seat means facing the outlet duct and being spatially enveloped by the omni-rounded periphery of the sections.

3. A check valve comprising an intake section and a discharge section joined together by screw-threaded means and together having an omni-rounded inner periphery forming an omni-rounded chamber, the intake section having an inlet duct leading to the chamber and a seat adapted to seat a check ball valve, encompassing the inner orifice of the inlet duct and affording a juncture of the duct and the periphery of the said section, and the discharge section having an outlet duct leading from the chamber, said chamber including in consecutive communication a bored guideway portion extending axially inwardly in the chamber from the inlet duct toward the outlet duct and including a plurality of radially spaced apart, elongated fin-guides axially disposed in the chamber, and coinciding with and engaging the omni-rounded inner periphery of the sections, and bored in the central axis to afford a slideway for a check ball valve; stop-seat means for the ball valve, said seat means having seating contours coinciding with the contour of the ball valve; and means for causing quick unseating of the valve by the back flow which rapidly moves said valve in the slideway into checking position onto the seat, said means facing the outlet duct and being spatially enveloped by the omni-rounded periphery of the sections.

4. A check valve comprising an intake section and a discharge section joined together by screw-threaded means and together having an ellipsoidal inner periphery forming an ellipsoidal chamber, the intake section having an inlet duct leading to the chamber and a seat adapted to seat a check ball valve, encompassing the inner orifice of the inlet duct and affording a juncture of the duct and the periphery of the said section, and the discharge section having an outlet duct leading from the chamber, said chamber including in consecutive communication a bored guideway portion extending axially inwardly in the chamber from the inlet duct toward the outlet duct and including a plurality of radially spaced apart, elongated fin-guides axially disposed in the chamber, bored in the central axis to afford a slideway for a check ball valve, and coinciding and communicating with the ellipsoidal periphery of the sections; seat means affording a stop for the valve, said seat means having seating contours coinciding with the contours of the ball valve; and a Venturi section for causing quick unseating of the valve by the back flow which rapidly moves said valve in the slideway into checking position onto the seat, said Venturi section facing the outlet duct and being spatially enveloped by the ellipsoidal periphery of the sections.

5. A check valve comprising an intake section and a discharge section joined together by screw-threaded means and together having an ellipsoidal inner periphery forming an ellipsoidal chamber, the intake section having an inlet duct leading to the chamber and a seat adapted to seat a check ball valve, encompassing the inner orifice of the inlet duct and affording a juncture of the duct and the periphery of the said section, and the discharge section having an outlet duct leading from the chamber, said chamber including in consectuive communication a bored guideway portion extending axially inwardly in the chamber from the inlet duct toward the outlet duct and including a plurality of radially spaced apart, elongated fin-giudes axially disposed in the chamber, bored in the central axis to afford a slideway for a check ball valve, and coinciding and communicating with the ellipsoidal periphery of the sections; stop seat means for the ball valve consisting of a ledge on each fin-guide projecting inwardly toward the same point in the central axis of the bored slideway, each ledge having an arced face, said faces together affording a stop-seat adapted to coincide with the contour of the ball valve; a Venturi section in juncture with the fin-guides, said stop-seat means and Venturi section being adapted for quick unseating of the valve by the back flow which rapidly moves said valve in the slideway into checking position onto the seat, said Venturi section facing the outlet duct and being spatially enveloped by the ellipsoidal periphery of the sections.

6. A check valve comprising an intake section and a discharge section joined together by screw-threaded means and together having an ellipsoidal inner periphery forming an ellipsoidal chamber, the intake section having an inlet duct leading to the chamber and a seat adapted to seat a check ball valve, encompassing the inner orifice of the inlet duct and affording a juncture of the duct and the periphery of the said section, and the discharge section having an outlet duct leading from the chamber, said chamber including in consecutive communication a bored guideway portion extending axially inwardly in the chamber from the inlet duct toward the outlet duct and including a plurality of radially spaced apart, elongated fin-guides axially disposed in the chamber, bored in the central axis to afford a slideway for a check ball valve, and coinciding and communicating with the ellipsoidal periphery of the sections; stop-seat means for the ball valve; and means for causing quick unseating of the valve by the back flow which rapidly moves said valve in the slideway into checking position onto the seat, said stop-seat means and said means consisting of a Venturi section in juncture with the fin-guides, the free Venturi end serving to direct and accelerate the back flow against the ball valve and the other end that encompasses the discharging orifice of said Venturi section serving as a stop-seat for the ball valve, said Venturi section facing the outlet duct to direct and accelerate the back flow against the ball valve and being spatially enveloped by the ellipsoidal periphery of the sections to permit a free unimpeded by-pass of the flow.

7. A check valve comprising an intake section and a discharge section joined together by screw-threaded means, and together having a substantially globular inner periphery forming a substantially globular chamber, adapted to facilitate flow, the intake section having an inlet duct leading to the chamber and a seat adapted to seat a check ball valve, encompassing the inner orifice of the inlet duct and affording a juncture of the duct and the periphery of said section, and the discharge section having an outlet duct leading from the chamber a bored guideway portion extending axially inwardly in the chamber from the inlet duct toward the outlet duct and including a plurality of radially spaced apart, elongated fin-guides axially disposed in the chamber, bored at the central axis to afford a slideway for a check ball valve, and coinciding and communicating with the substantially globular periphery of the sections; stop-seat means for the ball valve consisting of a ledge on each fin-guide projecting inwardly towards the same point in the central axis of the bored slideway, each ledge having an arced face, said faces together affording a stop-seat adapted to coincide with the contour of the ball valve, said stop-seat having flow directing means for causing quick unseating of the ball valve by the back flow which rapidly moves said ball valve in the slideway into checking position onto the seat, said stop-seat means facing the outlet duct and being spatially enveloped by the substantially globular periphery of the sections.

EDWARD SOKOLIK.

REFERENCES CITED

The following references are of record in the file of this patent:

UNITED STATES PATENTS

| Number | Name | Date |
|---|---|---|
| 187,364 | Downey | Feb. 13, 1877 |
| 708,529 | Camentz | Sept. 9, 1902 |
| 960,944 | Johnson | June 7, 1910 |
| 1,652,341 | Beck | Dec. 13, 1927 |
| 1,756,976 | Ehlers | May 6, 1930 |
| 1,796,455 | Gunn | May 17, 1931 |
| 1,892,649 | Buenger | Dec. 27, 1932 |
| 1,936,975 | Wasson | Nov. 28, 1933 |
| 2,091,138 | Crall | Aug. 24, 1939 |
| 2,278,715 | Stoyke | Apr. 7, 1942 |
| 2,354,255 | Gillum | July 25, 1944 |